Figure 1:
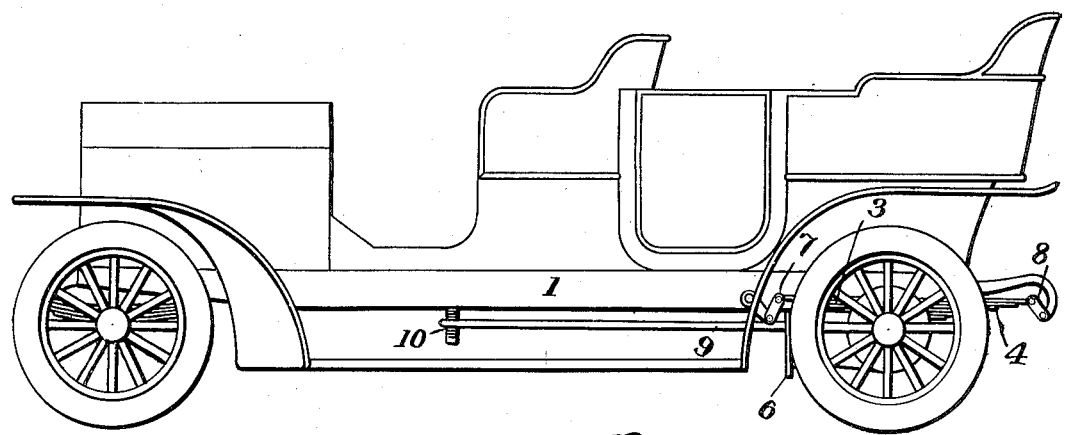

A. LOOMIS.
MOTOR VEHICLE.
APPLICATION FILED JAN. 2, 1908.

935,211.

Patented Sept. 28, 1909.
2 SHEETS—SHEET 1.

Witnesses
J. G. Hinkel
J. J. McCarthy

Inventor
Allen Loomis
By Foster Freeman Watson & Coit
Attorneys

A. LOOMIS.
MOTOR VEHICLE.
APPLICATION FILED JAN. 2, 1908.
935,211.
Patented Sept. 28, 1909.
2 SHEETS—SHEET 2.
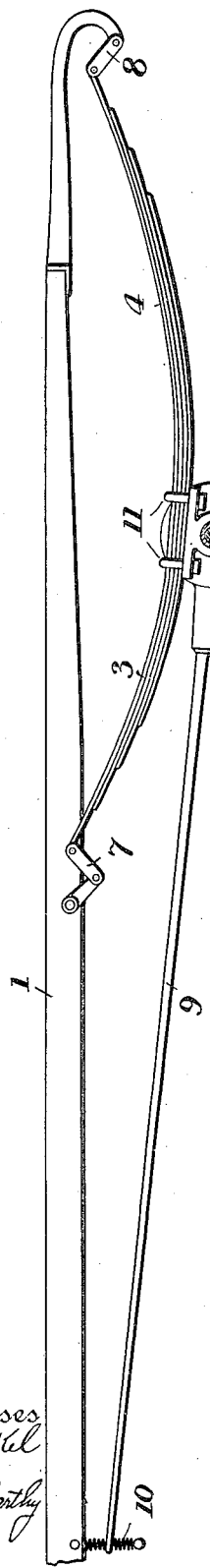
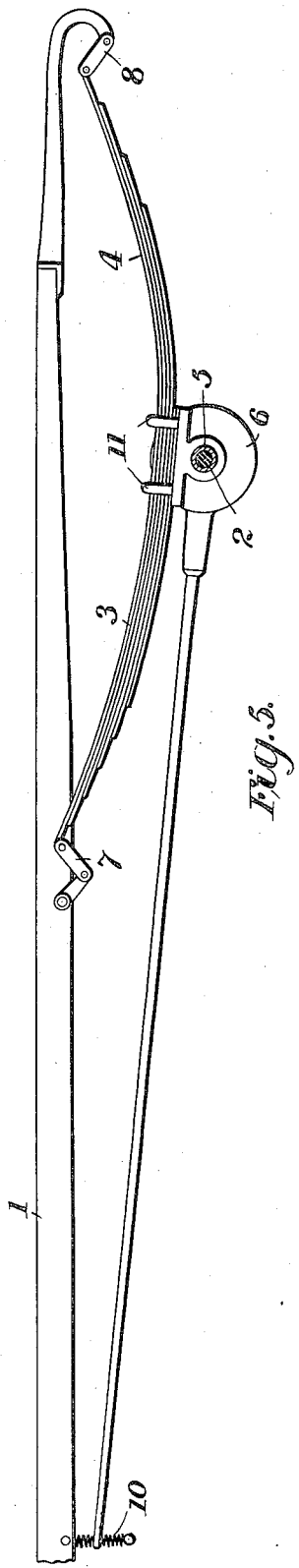
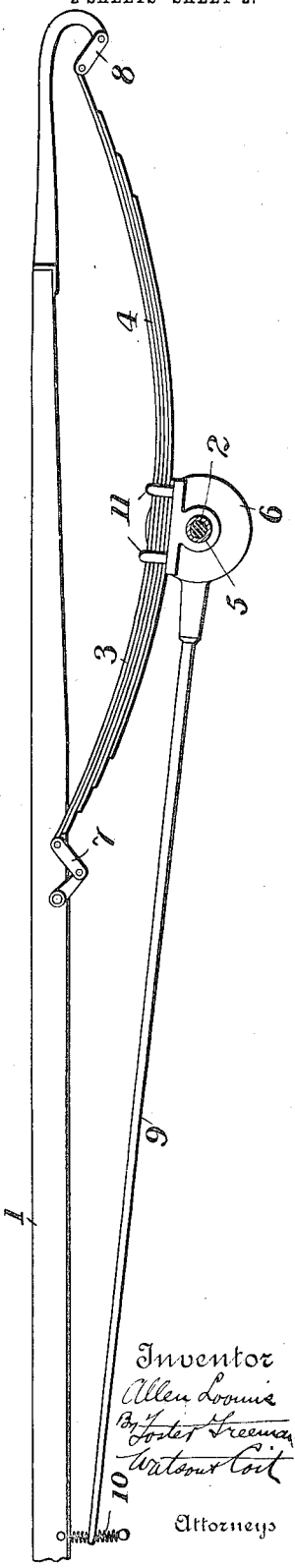
Witnesses
Inventor
Allen Loomis
By Foster Freeman,
Watson Coit
Attorneys

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE.

935,211.	Specification of Letters Patent.	Patented Sept. 28, 1909.

Application filed January 2, 1908. Serial No. 408,923.

*To all whom it may concern:*

Be it known that I, ALLEN LOOMIS, a citizen of the United States, residing at Detroit, Wayne county, in the State of Michigan, have invented certain new and useful Improvements in Motor-Vehicles, of which the following is a specification.

In motor cars as commonly constructed the divided rear or driving axle is mounted in a fixed or non-rotating axle casing, which casing also incloses the differential gearing and, in some instances, the change speed gearing. The various gears have their bearings in the casing and the re-action of the forces which turn the axle tends to turn the axle casing in the opposite direction. To overcome this re-action it is customary to use a so-called torsion rod or lever, one end of which is rigidly connected in some suitable manner with the rear axle casing, while the other end is connected with the motor vehicle frame. It is also customary to connect the axle casing rigidly with the rear springs of the vehicle and the vehicle frame and body are thus supported on the axle casing. Heretofore the axle casing has been connected to the rear springs at or in the rear of the middle points of the springs and it has been found that when the springs are flexed to a considerable degree a lateral strain is imparted to the torsion rods which often results in bending or breaking them. It is desirable that the torsion rod should always tend to remain radial to its point of connection with the vehicle frame but as heretofore constructed this tendency has not been realized.

I have discovered that the axle casing, the rear springs and the torsion rod may be so constructed and related that the rod will tend to remain radial to its point of connection with the frame in all positions which the axle is likely to assume with respect to the vehicle body, that is, under all conditions of load and stress upon the springs which the vehicle is adapted for. Broadly stated, I accomplish this object by so constructing and relating the parts that the portions of the springs rearward of the rear axle casing will flex more freely than the portions of the springs forward of the casing. This result may be obtained either by making the forward parts of the springs stiffer than the rear parts or by connecting the axle to the springs forward of the middle thereof, or by combining these two features.

Figure 2:
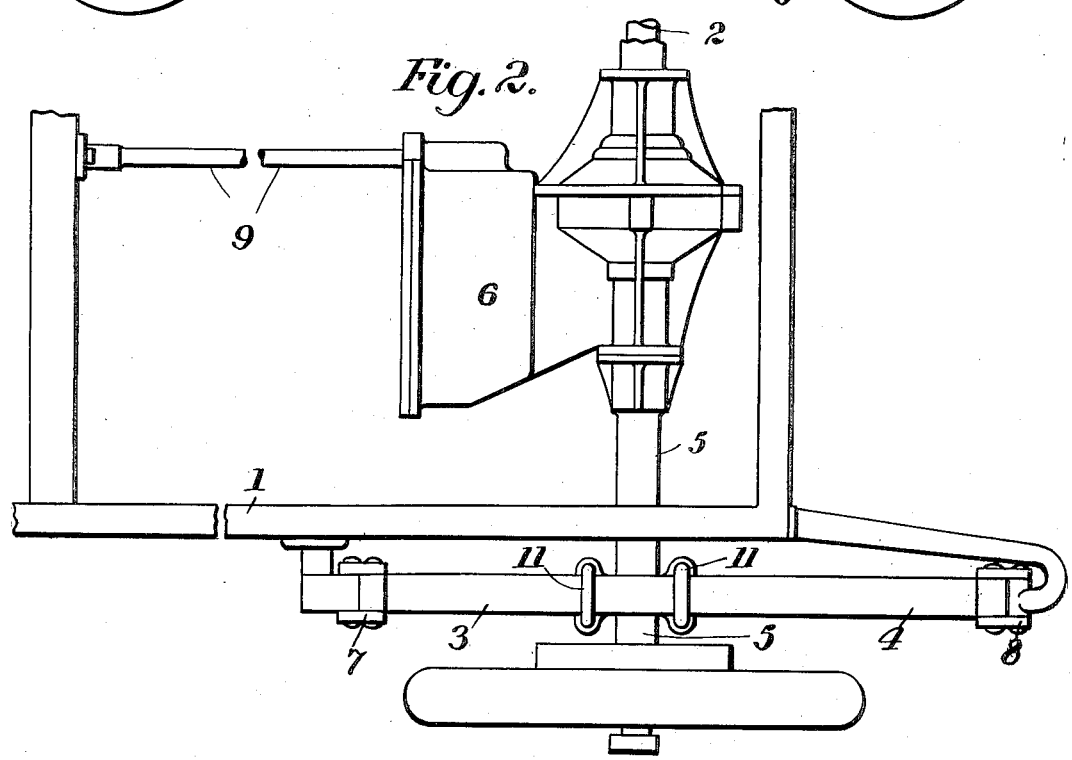

I shall describe the invention in detail in connection with the accompanying drawing, in which, Figure 1 is a side view in outline of a motor vehicle embodying the invention, partly broken away; Fig. 2 is a plan view of parts of the frame and rear axle and one of the rear springs; Fig. 3 is a side elevation of a spring and torsion rod illustrating one form of the invention; Figs. 4 and 5 are similar views illustrating other forms of the invention.

Referring to the drawing, 1 indicates the frame of a motor vehicle, 2 the divided rear or driving axle, 3, 4, the front and rear parts respectively of the rear springs, 5 the rear axle casing upon which said springs are rigidly mounted, and 6 the gear casing which is rigidly connected with the rear axle casing. The springs may be connected to the vehicle body in any suitable manner. As shown the springs are connected at their forward and rear ends with shackles 7 and 8, which shackles are pivotally connected with the frame. A torsion rod 9 is rigidly connected at its rear end either directly or indirectly with the axle casing. As shown in Fig. 2, it is connected with the gear case 6 which latter is rigidly connected with the axle casing. At its forward end the torsion rod is connected with the vehicle frame, preferably by a suitable yielding connection 10 which permits of slight vibration. The rear springs of the vehicle are rigidly connected with the rear axle casing by clamps 11 or in any suitable manner.

Heretofore it has been customary to connect the rear axle casing to the springs at or in the rear of the middle points of the latter and it has also been customary to make the springs substantially symmetrical with respect to their middle points, that is, so that they would flex equally in front and rear of their middle points when supported at their middle points upon the axle. This has resulted, as heretofore stated, in frequent bending or breaking of the torsion rods on account of the tendency of the said rods to swing away from their point of connection with the frame. I have found that the spring can be so constructed or so related to the axle that the torsion rod will at all times tend to remain substantially radial to its point of connection with the frame and in a practical test of my invention in which the torsion rod was disconnected from the frame, at its forward end, the rod remained substantially radial to a fixed point in all conditions of loading of the springs. I obtain this result either by connecting the axle casing to the spring forward of the middle point thereof, as shown in Fig. 3, or by connecting the axle casing at or near the middle of the spring and making the forward part of the spring stiffer than the rearward part, as shown in Fig. 4, or by combining these relations, that is, by connecting the axle casing to the spring in front of the middle part thereof and also making the forward part of the spring stiffer than the rearward part, as shown in Fig. 5. In either case the rear portion of the spring flexes more than the forward portion under a given load with the result that the torsion rod tends to remain radial in all positions to a point which is fixed with relation to the frame and hence is relieved of bending strain due to the movements of the vehicle relatively to the axle.

The object of the invention may be stated in another way to cause the axle casing and rear axle, in their movements relative to the frame, to move in the arc of a circle having the forward end of the torsion rod as a center. It will be understood that the present invention is designed to relieve the torsion rod of the stress which has been put upon it due to the relative arrangement of the springs and rear axle casing and that it has nothing to do with the ordinary function of the torsion rod in preventing turning of the rear axle casing due to the re-action of the driving mechanism.

Having described my invention what I claim and desire to secure by Letters-Patent is, 1. In a motor vehicle, the combination with the frame, the rear axle casing and the torsion rod rigidly connected with the rear axle casing and connected at its forward end with the frame, of springs connected to said frame and rigidly secured between their ends to said rear axle casing, the portions of said springs rearward of said casing being adapted to flex more freely than the portions forward thereof, for the purpose set forth.

2. In a motor vehicle, the combination with the frame, the rear axle casing and the torsion rod rigidly connected with the rear axle casing and connected at its forward end with the frame, of springs connected to said frame and rigidly secured between their ends to said rear axle casing, the relative stiffness of the portions of the springs in front and rear of the casing being such that the movements of the casing will be substantially in the arc of a circle having the forward end of the torsion rod as a center, for the purpose set forth.

3. In a motor vehicle, the combination with the frame, the rear axle casing and the torsion rod rigidly connected with the rear axle casing and connected at its forward end with the frame, of springs connected to said frame and rigidly secured between their ends to said rear axle casing, the springs and axle casing being so related that the torsion rod will tend to remain radial to a single point during the up and down movements of the vehicle relatively to the axle.

4. In a motor vehicle, the combination with the frame, the rear axle casing and the torsion rod rigidly connected with the rear axle casing and connected at its forward end with the frame, of springs connected to said frame and rigidly secured between their ends to said rear axle casing, the portions of said springs forward of said casing being stiffer than the portion rearward thereof, for the purpose set forth.

5. In a motor vehicle, the combination with the frame, the rear axle casing and the torsion rod rigidly connected with the rear axle casing and connected at its forward end with the frame, of springs connected to said frame and rigidly secured to said rear axle casing, the portions of said springs forward of said casing being shorter than the portions rearward thereof, for the purpose set forth.

6. In a motor vehicle, the combination with the frame, the rear axle casing and the torsion rod rigidly connected with the rear axle casing and connected at its forward end with the frame, of springs connected to said frame and rigidly secured to said rear axle casing, the portions of said springs forward of said casing being shorter and stiffer than the portions rearward thereof, for the purpose set forth.

In testimony whereof I affix my signature in presence of two witnesses.

ALLEN LOOMIS.

Witnesses:
 MILTON TIBBETTS,
 CLARA I. DALE.